(12) United States Patent
Kawasaki et al.

(10) Patent No.: US 10,333,174 B2
(45) Date of Patent: Jun. 25, 2019

(54) LITHIUM ION SECONDARY BATTERY AND METHOD FOR MANUFACTURING SAME

(71) Applicant: NEC CORPORATION, Tokyo (JP)

(72) Inventors: Daisuke Kawasaki, Tokyo (JP); Kenichi Shimura, Tokyo (JP); Noboru Yoshida, Tokyo (JP); Kazuhiko Inoue, Tokyo (JP); Jiro Iriyama, Tokyo (JP)

(73) Assignee: NEC Corporation, Tokyo (JP)

( * ) Notice: Subject to any disclaimer, the term of this patent is extended or adjusted under 35 U.S.C. 154(b) by 59 days.

(21) Appl. No.: 15/560,639

(22) PCT Filed: Mar. 22, 2016

(86) PCT No.: PCT/JP2016/058998
§ 371 (c)(1),
(2) Date: Sep. 22, 2017

(87) PCT Pub. No.: WO2016/152860
PCT Pub. Date: Sep. 29, 2016

(65) Prior Publication Data
US 2018/0090792 A1     Mar. 29, 2018

(30) Foreign Application Priority Data
Mar. 24, 2015   (JP) ................. 2015-061777

(51) Int. Cl.
*H01M 10/0525*   (2010.01)
*H01M 10/0585*   (2010.01)
(Continued)

(52) U.S. Cl.
CPC ......... *H01M 10/0585* (2013.01); *H01M 2/16* (2013.01); *H01M 4/0404* (2013.01);
(Continued)

(58) Field of Classification Search
CPC ............ H01M 10/0585; H01M 4/131; H01M 10/0525; H01M 10/0569; H01M 4/485;
(Continued)

(56) References Cited

U.S. PATENT DOCUMENTS

| 2015/0155555 A1* | 6/2015 | Yamamoto | ............ H01M 4/525 |
| | | | 429/188 |
| 2015/0349332 A1* | 12/2015 | Azami | .................. H01M 4/133 |
| | | | 429/188 |

(Continued)

FOREIGN PATENT DOCUMENTS

| JP | 10-208776 | 8/1998 |
| JP | 11-307133 | 11/1999 |

(Continued)

OTHER PUBLICATIONS

International Search Report dated Jun. 7, 2016, in corresponding PCT International Application No. PCT/JP2016/058998.

*Primary Examiner* — Stewart A Fraser
(74) *Attorney, Agent, or Firm* — Finnegan, Henderson, Farabow, Garrett & Dunner, L.L.P.

(57) ABSTRACT

The present invention relates to a lithium ion secondary battery comprising a positive electrode having a coating amount per unit area of 50 mg/cm$^2$ or more and an electrode density of 3.3 g/cc or more and a negative electrode having a coating amount per unit area of 24 mg/cm$^2$ or more and an electrode density of 1.5 g/cc or more, a separator having a shrinking ratio of 2% or less by heat treatment at 80° C. for 6 hours, and an electrolyte solution comprising at least one sulfonic acid ester compound, and a ratio of a sulfur content in the central portion (As) and a sulfur content in the edge portion (Bs) of the positive electrode and the negative electrode, in each, is 0.7≤As/Bs≤1.1.

10 Claims, 3 Drawing Sheets

(51) Int. Cl.
*H01M 4/04* (2006.01)
*H01M 2/16* (2006.01)
*H01M 4/505* (2010.01)
*H01M 4/525* (2010.01)
*H01M 4/131* (2010.01)
*H01M 4/485* (2010.01)
*H01M 10/04* (2006.01)
*H01M 10/0569* (2010.01)
*H01M 4/02* (2006.01)

(52) U.S. Cl.
CPC ........... *H01M 4/131* (2013.01); *H01M 4/485* (2013.01); *H01M 4/505* (2013.01); *H01M 4/525* (2013.01); *H01M 10/0413* (2013.01); *H01M 10/0525* (2013.01); *H01M 10/0569* (2013.01); *H01M 2004/021* (2013.01); *H01M 2220/20* (2013.01); *H01M 2300/0028* (2013.01); *Y02P 70/54* (2015.11); *Y02T 10/7011* (2013.01)

(58) Field of Classification Search
CPC ........... H01M 4/0404; H01M 10/0413; H01M 4/525; H01M 2/16; H01M 4/505
See application file for complete search history.

(56) References Cited

U.S. PATENT DOCUMENTS

2017/0207484 A1* 7/2017 Zhamu ................ H01M 4/5815
2017/0207488 A1* 7/2017 Zhamu .............. H01M 10/0585

FOREIGN PATENT DOCUMENTS

| | | |
|---|---|---|
| JP | 2001-266890 | 9/2001 |
| JP | 2003-217587 | 7/2003 |
| JP | 2004-006286 | 1/2004 |
| JP | 2011-171108 | 9/2011 |
| JP | 2013-114848 | 11/2011 |
| JP | 5151033 | 12/2012 |
| JP | 5168989 | 3/2013 |
| JP | 2013-519968 | 5/2013 |
| JP | 2013-254633 | 12/2013 |
| WO | WO 2002/093678 | 11/2002 |
| WO | WO 2008/062895 | 5/2008 |
| WO | WO 2013/062056 | 5/2013 |
| WO | WO 2014/132684 | 9/2014 |
| WO | WO 2014/189329 | 11/2014 |

* cited by examiner

LITHIUM ION SECONDARY BATTERY AND METHOD FOR MANUFACTURING SAME

CROSS-REFERENCE TO RELATED PATENT APPLICATIONS

This application is a National Stage Entry of International Application No. PCT/JP2016/058998 filed Mar. 22, 2016, which claims priority from Japanese Patent Application No. 2015-061777, filed Mar. 24, 2015. The entire contents of the above-referenced applications are expressly incorporated herein by reference.

TECHNICAL FIELD

The present invention relates to a lithium ion secondary battery, particularly to a lithium ion secondary battery in which impregnation property of an electrolyte solution into an electrode is improved, and further relates to a method of manufacturing the lithium ion secondary battery.

BACKGROUND ART

Non-aqueous electrolyte secondary batteries such as lithium ion secondary batteries have advantages such as high energy density, excellent long-term reliability and the like, and therefore they have been put into practical use in notebook-type personal computers and mobile phones. In recent years, the performance of electronic device has been improved and its use in electric vehicles and the like have been advanced, and thus further improvement of battery characteristics such as capacity, energy density, safety and the like are strongly desired.

For example, there have been made various studies on heat-resistant separators for improving the safety of lithium ion secondary batteries. For example, Patent Document 1 discloses a separator for a battery using a porous film composed of an aromatic polyamide represented by a particular formula, in which aromatic rings having para orientation occupy 90 mol % or more of all aromatic rings, the coefficient of static friction μs of 0.3 to 1.8, and Mw/Mn which is the ratio of the weight average molecular weight Mw to the number average molecular weight Mn of the aromatic polyamide is in the range of 1.3≤Mw/Mn≤4.5. In addition, Patent Document 2 discloses that by the use of a separator of laminated porous film having the laminate of a heat-resistant layer containing a heat-resistant resin and a shutdown layer containing a thermoplastic resin, the thermal film-breakdown of the secondary battery can be prevented.

On the other hand, in order to improve the energy density of a lithium ion secondary battery, it is effective to increase the electrode density. However, in the electrode having a large electrode density, since the porosity in the electrode becomes small, there has been a problem that impregnation of the electrolyte solution into the electrode is insufficient.

In order to solve such problems, a method of increasing the impregnation time from when the electrolyte solution is injected to when initial charge is performed, a method of adding small vibration and periodic vibration at the time of injecting the electrolyte solution, and a method of heating a battery container after injecting the solution, for example such as a method of controlling an outer wall temperature of a battery can to be 30° C. or higher and 50° C. or lower (Patent Document 3) and the like have been proposed.

CITATION LIST

Patent Document

Patent Document 1: Japanese Patent No. 5151033
Patent Document 2: International Publication WO 2008/062895 pamphlet
Patent Document 3: Japanese Patent Laid-Open Publication No. H10 (1998)-208776

SUMMARY OF INVENTION

Technical Problem

As described above, various methods for improving the impregnation property of the electrolyte solution have been studied. However, in order to respond to the demand for higher capacity and higher energy density in recent years, it is important to increase the coating amount of the electrode and to increase the density of the electrode and thereby increase the volume energy density. In a lithium ion secondary battery using such an electrode having a high energy density, even when employing the above-described methods, it has become difficult to achieve the sufficient impregnation property of the electrolyte solution in some cases. As a result, there have been problems that a cell capacity as designed cannot be obtained, and several charging and discharging steps or a very long impregnation period is required in order to obtain a cell capacity close to the designed capacity.

Accordingly, an object of the present invention to provide a lithium ion secondary battery having an electrode having a high energy density and an improved impregnation property of an electrolyte solution.

Solution to Problem

In one embodiment of the present invention relates to:
a lithium ion secondary battery comprising an electrode element comprising a positive electrode, a negative electrode and a separator, and an electrolyte solution,
wherein a coating amount per unit area of the positive electrode is 50 mg/cm² or more and an electrode density of the positive electrode is 3.3 g/cc or more,
a coating amount per unit area of the negative electrode is 24 mg/cm² or more and an electrode density of the negative electrode is 1.5 g/cc or more,
the separator has a shrinking ratio of 2% or less by heat treatment at 80° C. for 6 hours,
the electrolyte solution comprises at least one sulfonic acid ester compound, and
a ratio of a sulfur content in the central portion (As) and a sulfur content in the edge portion (Bs) of the positive electrode and the negative electrode, in each, is 0.7≤As/Bs≤1.1.

Another embodiment of the present invention relates to:
a method of manufacturing a lithium ion secondary battery comprising an electrode element comprising a positive electrode, a negative electrode and a separator, and an electrolyte solution,
wherein a shrinking ratio of the separator by heat treatment at 80° C. for 6 hours is 2% or less,
the method comprising the steps of:
preparing an electrode element comprising a positive electrode, a negative electrode and a separator,
enclosing the prepared electrode element in an outer package, injecting the electrolyte solution into an outer package, sealing the outer package comprising the electrode element and the electrolyte solution, wherein in the step of injecting the electrolyte solution, the electrolyte solution is heated to 80° C. or higher to perform injection.

Advantageous Effect of Invention

According to the present invention, it is possible to provide a lithium ion secondary battery in which the impregnation property of an electrolyte solution to an electrode is improved.

DESCRIPTION OF EMBODIMENTS

The inventors of the present invention have found that in a lithium ion secondary battery using an electrode having a high energy density, as an indicator of impregnation property of an electrolyte solution, when a concentration difference of a sulfur component derived from an electrolyte solution additive in an electrode is within a particular range, a lithium ion secondary battery having excellent battery characteristics can be obtained.

That is, the lithium ion secondary battery according to the present embodiment has (1) a positive electrode having a coating amount per unit area of 50 mg/cm$^2$ or more and an electrode density of 3.3 g/cc or more and a negative electrode having a coating amount per unit area of 24 mg/cm$^2$ or more and an electrode density of 1.5 g/cc or more, (2) a shrinking ratio of 2% or less by heat treatment at 80° C. for 6 hours, (3) the electrolyte solution comprising a sulfur-containing additive such as a sulfonic acid ester and (4) in the positive electrode and the negative electrode, a ratio of a sulfur content in the central portion (As) and a sulfur content in the edge portion (Bs) of the positive electrode and the negative electrode, in each, is $0.7 \leq As/Bs \leq 1.1$.

In the lithium ion secondary battery in which the ratio (As/Bs) of the sulfur content in the electrode is 0.7 or more, since the interior of the electrode is sufficiently impregnated with the electrolyte solution, a capacity closer to the design capacity can be taken out. The ratio of the sulfur content (As/Bs) is more preferably in the range of $0.8 \leq As/Bs \leq 1.1$, and further preferably is the range of $0.9 \leq As/Bs \leq 1.01$.

Figure 1:
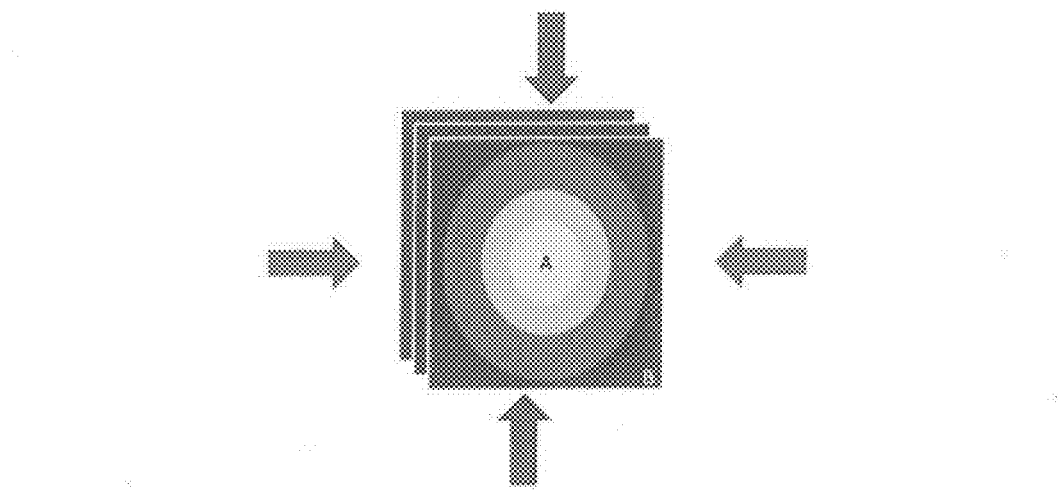
FIG. 1 is a schematic top view of a stacked electrode included in a lithium ion secondary battery according to one embodiment of the present invention.

In the present specification, the sulfur content in the electrode is defined as follows. FIG. 1 is a schematic top view of a stacked electrode included in an electrode element of a stacked type lithium ion secondary battery. In the stacked type lithium ion secondary battery, as shown by the arrow in FIG. 1, the electrolyte solution penetrates from the periphery of the electrode active material layer toward the center. Therefore, the impregnation of the electrolyte solution takes a long time and the coating film concentration of the additive is lower in the central portion (A) than that in the edge portion (B). Here, when the electrode active material layer has a substantially rectangular shape having a long side (a) cm×short side (b) cm, the edge portion (B) is defined as a region outside of an ellipse having major axis (a) cm×minor axis (b) cm inscribed in the rectangle, and the central portion (A) is defined as a central region which is 20% (area ratio) of the ellipse. The sulfur content in the central portion (As) is the average value of the sulfur concentration at any five points in the region A, and the sulfur content in the edge portion (Bs) is the average value of the sulfur concentration at any five points in the region B. As a method for measuring the sulfur concentration, a known method may be used, but for example, the sulfur concentration may be specified by oxygen combustion ion chromatography.

The degree of impregnation of the electrolyte solution into the electrode varies depending on the tab (one-sided tab, both-sided tabs, tab width etc.) included by the electrode element, the condition of standing the electrode element during impregnation, the shape of the lithium ion secondary battery and the like. In such cases, the sulfur concentration in the region with the lowest sulfur concentration in the electrode may be evaluated as the sulfur content (As) and the sulfur concentration in the region with the highest sulfur concentration in the electrode may be evaluated as the sulfur content (Bs). The sulfur concentration may be evaluated, for example, by dividing the electrode active material layer into five regions in the long-side direction and dividing it into five regions in the short-side direction, thereby dividing the electrode active material layer into a total of 25 regions, and by measuring the sulfur concentration in each region.

Hereinafter, a structure of the lithium ion secondary battery according to one embodiment of the present invention will be described in detail.

<Positive Electrode>

The positive electrode according to the present example embodiment comprises a positive electrode current collector and a positive electrode active material layer formed on one side or both sides of the positive electrode current collector.

The positive electrode according to the present embodiment has a high energy density, specifically, a coating amount (deposit) per unit area is 50 mg/cm$^2$ or more and the electrode density is 3.3 g/cc or more. From the viewpoint of increasing the energy density, the coating amount per unit area of the positive electrode is more preferably 55 mg/cm$^2$ or more, further preferably 60 mg/cm$^2$ or more, and the electrode density is more preferably 3.35 g/cc or more, further preferably 3.4 g/cc or more. Although the upper limit is not particularly limited, it is preferable that the coating amount per unit area is 70 mg/cm$^2$ or less and the electrode density is 3.7 g/cc or less.

Here, the coating amount (deposit) per unit area of the electrode (mg/cm$^2$) represents {Mass of an active material layer (mg)/Coating area of active material layer (cm$^2$)}, and the electrode density (mg/cc) represents {Mass of an active material layer (mg)/Volume of an active material layer (cc)}.

Here, the mass of an active material layer represents the total mass of an active material, a binder, and, if necessary, a conductive auxiliary material and the like, which constitute the active material layer after drying. When the active material layer is applied on both sides of the current collector, it represents the mass of the active material layer on one side.

(Positive Electrode Active Material)

The positive electrode active material is not particularly limited as long as it can absorb and desorb lithium, and known positive electrode active materials can be used.

From the viewpoint of high energy density, a compound having high capacity is preferably contained. Examples of the high capacity compound include lithium nickelate ($LiNiO_2$), or lithium nickel composite oxides in which a part of the Ni of lithium nickelate is replaced by another metal element, and layered lithium nickel composite oxides represented by the following formula (A) are preferred.

$$Li_yNi_{(1-x)}M_xO_2 \quad (A)$$

wherein $0 \leq x<1$, $0<y \leq 1.5$, and M is at least one element selected from the group consisting of Co, Al, Mn, Fe, Mg, Ba, Ti and B.

As one embodiment of the positive electrode active material, it is preferred that in the formula (A), $0 \leq x<1$, $0<y \leq 1.2$, and M is at least one element selected from the group consisting of Co, Al, Mn, Fe, Ti, and B.

From the viewpoint of high capacity, it is preferable that the Ni content is high, that is, so-called high-nickel lithium nickel composite oxides are preferably contained. Such a compound has a high capacity because it has a high Ni content, and has a longer lifetime as compared with $LiNiO_2$ because a part of Ni is substituted. As one embodiment of the high-nickel lithium nickel composite oxide, a compound represented by the following formula (1) is exemplified.

$$Li_\alpha Ni_\beta Me_\gamma O_2 \quad (1)$$

(In formula (1), $0.9 \leq \alpha \leq 1.5$, $\beta+\gamma=1$, $0.5 \leq \beta<1$, Me is at least one selected from the group consisting of Co, Mn, Al, Fe, Mg, Ba, Ti and B.)

In formula (1), $\alpha$ is more preferably $1 \leq \alpha \leq 1.2$. $\beta$ is more preferably $\beta \geq 0.6$, further more preferably $\beta \geq 0.7$, and still particularly more preferably $\beta \geq 0.8$. Me preferably comprises at least one selected from Co, Mn, Al, and Fe, and more preferably comprises at least one selected from Co, Mn and Al.

Examples of the compound represented by the formula (1) include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $\beta \geq 0.7$, and $\gamma \leq 0.2$) (may be abbreviated as NCM), and $Li_\alpha Ni_\beta Co_\gamma Al_\delta O_2$ ($0<\alpha \leq 1.5$, preferably $1 \leq \alpha \leq 1.5$, and more preferably $1 \leq \alpha \leq 1.2$, $\beta+\gamma+\delta=1$, $\beta \geq 0.6$, preferably $\beta \geq 0.7$, and $\gamma \leq 0.2$) (may be abbreviated as NCA)), and particularly preferably $Li_\alpha Ni_\beta Co_\gamma Mn_\delta O_2$ ($1 \leq \alpha \leq 1.2$, $\beta+\gamma+\delta=1$, $\beta \geq 0.8$, $\gamma \leq 0.2$) or $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Mn_{0.15}Co_{0.05}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

The above high-nickel lithium nickel composite oxide may be used alone or in combination of two or more. From the viewpoint of increasing the capacity, it is preferable that the above high-nickel lithium nickel composite oxide is contained in an amount of preferably 75% by mass or more, more preferably 85% by mass or more, still more preferably 90% by mass or more, and still more particularly preferably 95% by mass or more. Also, 100% by mass may be preferable.

From the viewpoint of thermal stability, it is also preferred that the content of Ni does not exceed 0.5, that is, x is 0.5 or more in the formula (A). It is preferable that $1<y \leq 1.2$ in formula (A). In addition, it is also preferred that particular transition metals do not exceed half. Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $0.2 \leq \beta \leq 0.5$, $0.1 \leq \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high ($\beta$ is 0.6 or more) in the formula (1) and a material in which the content of Ni does not exceed 0.5 ($\beta$ is 0.5 or less, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$ or materials in which a part of the transition metal in this material is replaced by other metal(s); materials in which Li is excessive as compared with the stoichiometric composition in these lithium transition metal oxides; materials having olivine structure such as $LiMPO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La are also usable.

Any of the positive electrode active materials described above may be used alone or in combination of two or more.

(Binder for Positive Electrode)

Examples of the positive electrode binder include, but not particularly limited to, for example, polyvinylidene fluoride, vinylidene fluoride-hexafluoropropylene copolymer, vinylidene fluoride-tetrafluoroethylene copolymer, styrene-butadiene copolymer rubber (SBR), polytetrafluoroethylene, polypropylene, polyethylene, polyimide, polyamideimide, polyacrylic acid and the like. Among them, polyvinylidene fluoride or polytetrafluoroethylene is preferable from the viewpoint of versatility and low cost, and polyvinylidene fluoride is more preferable. The amount of the positive electrode binder is preferably 2 to 10 parts by mass based on 100 parts by mass of the positive electrode active material, from the viewpoint of the binding strength and energy density that are in a trade-off relation with each other.

(Conductive Assisting Agent for Positive Electrode)

For the coating layer containing the positive electrode active material, a conductive assisting agent may be added for the purpose of lowering the impedance. Examples of the conductive assisting agent include, flake-like, soot, and fibrous carbon fine particles and the like, for example, graphite, carbon black, acetylene black, vapor grown carbon fibers and the like. The content of the conductive assisting agent for the positive electrode is preferably 1 to 5 parts by mass with respect to 100 parts by mass of the positive electrode active material.

(Positive Electrode Current Collector)

The positive electrode current collector is not particularly limited, but for example, a current collector using aluminum, an aluminum alloy, iron-nickel-chromium-molybdenum based stainless steel can be used.

The positive electrode according to the present embodiment can be produced by a known method. For example, a slurry containing a positive electrode active material, a binder and, if necessary, a conductive assisting agent and the like and a dispersion medium is applied on a current collector so that the coating amount after drying is in the particular range, dried to remove the dispersion medium, and then pressed to form a positive electrode to obtain the particular electrode density. The positive electrode active material layer is formed so that the current collector has an extension portion to be connected to a positive electrode terminal. That is, the positive electrode active material layer is not coated on this extension portion.

<Negative Electrode>

The negative electrode according to the present embodiment comprises a negative electrode current collector and a negative electrode active material layer formed on one side or both sides of the negative electrode current collector.

The negative electrode according to the present example embodiment has high energy density, the coating amount (deposit) per unit area is 24 mg/cm$^2$ or more, and the electrode density is 1.5 g/cc or more. From the viewpoint of increasing the energy density of the lithium ion secondary battery, the coating amount per unit area of the negative electrode is more preferably 25 mg/cm$^2$ or more and further preferably 26 mg/cm$^2$ or more, and the electrode density is more preferably 1.55 g/cc or more and further preferably 1.6 g/cc or more. Although the upper limit is not particularly limited, it is preferable that the coating amount per unit area is 30 mg/cm$^2$ or less and the electrode density is 1.7 g/cc or less.

The negative electrode active material in the present embodiment is not particularly limited, and examples thereof include carbon materials capable of absorbing and desorbing lithium ions, metals capable of forming an alloy with lithium, a metal oxide capable of absorbing and desorbing lithium ions, and the like.

Examples of the carbon material include graphite (natural graphite, artificial graphite, etc.), amorphous carbon, diamond-like carbon, carbon nanotube, or composites of these. Highly crystalline graphite has high electrical conductivity and is excellent in adhesion to a negative electrode current collector made of a metal such as copper and in voltage flatness. On the other hand, amorphous carbons having a low crystallinity exhibit relatively small volume expansion, and therefore have effect of highly relaxing the volume expansion of the whole negative electrode, and hardly undergo the degradation due to nonuniformity such as crystal grain boundaries and defects.

Examples of metals include Al, Si, Pb, Sn, In, Bi, Ag, Ba, Ca, Hg, Pd, Pt, Te, Zn, La, and alloys of two or more of these. These metals or alloys may be used in combination of two or more. In addition, these metals or alloys may contain one or more nonmetallic elements.

Examples of the metal oxide include silicon oxide, aluminum oxide, tin oxide, indium oxide, zinc oxide, lithium oxide, and composites of these. It is preferable to include tin oxide or silicon oxide, and more preferably silicon oxide, as a negative electrode active material. This is because silicon oxide is relatively stable and hardly causes reaction with other compounds. It is also preferable that all or a part thereof has an amorphous structure. Further, the amorphous structure is considered to have relatively few nonuniformity-associated elements, such as crystal grain boundaries and defects. The fact that all or a part of the metal oxide has an amorphous structure can be confirmed by X-ray diffraction measurement (general XRD measurement). Specifically, when the metal oxide does not have an amorphous structure, a peak characteristic to the metal oxide is observed, but in the case where all or a part of the metal oxide has an amorphous structure, a peak characteristic to metal oxide is observed as a broad peak.

Carbon materials, metals, and metal oxides may be not only used alone, but also in combination. For example, similar materials such as graphite and amorphous carbon may be mixed with each other, or different materials such as graphite and silicon may be mixed. In one embodiment, from the viewpoint of high energy density, in addition to carbon materials such as graphite, It is also preferable to contain 0.01 to 20% by mass of metal Si and/or $SiO_x$ ($0<x\leq2$).

(Binder for Negative Electrode)

As the negative electrode binder, the same materials as those for the positive electrode binder may be used. Examples of the negative electrode binder include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide, polyacrylic acid and the like. Among them, polyvinylidene fluoride or polytetrafluoroethylene is preferable from the viewpoint of versatility and low cost, and polyvinylidene fluoride is more preferable. The amount of the negative electrode binder is preferably 1 to 20 parts by mass based on 100 parts by mass of the negative electrode active material, from the viewpoint of the binding strength and energy density being in a trade-off relation with each other. It is also possible to mix a styrene-butadiene copolymer rubber and carboxymethyl cellulose to prepare a binder.

(Conductive Assisting Agent for Negative Electrode)

For the coating layer containing the negative electrode active material, a conductive assisting agent may be added for the purpose of lowering the impedance. Examples of the conductive assisting agent include, flake-like, soot, and fibrous carbon fine particles and the like, for example, carbon black, acetylene black, vapor grown carbon fibers and the like. The content of the conductive assisting agent is preferably 0.3 to 5 parts by mass with respect to 100 parts by mass of the negative electrode active material.

(Current Collector for Negative Electrode)

As the negative electrode current collector, from the view point of electrochemical stability, aluminum, nickel, stainless steel, chromium, copper, silver, and alloys thereof are preferred. As the shape thereof, foil, flat plate, mesh and the like are exemplified. In particular, copper or an alloy of copper is preferable.

The negative electrode according to the present embodiment can be produced by a known method. For example, a slurry containing a negative electrode active material, a binder and, if necessary, a conductive assisting agent and the like and a dispersion medium is applied on a current collector so that the coating amount after drying fails within a desired range, dried to remove the dispersion medium, and then pressed to form a negative electrode. The negative electrode active material layer is formed so that the current collector has an extension portion to be connected to a negative electrode terminal. That is, the negative electrode active material layer is not coated on this extension portion.

<Separator>

As a separator according to the present embodiment, it is preferable to use a separator having a small heat shrinking ratio. Specifically, it is preferable that the shrinking ratio by heat treatment at 80° C. for 6 hours is 2% or less, more preferably 1% or less, and further preferably 0.5% or less. It is also preferable that it is 0% (it does not shrink).

By using a separator having a small heat shrinking ratio, the heat resistance of the lithium ion secondary battery can be enhanced. Further, by using a separator having a small shrinking ratio by heat treatment at 80° C. for 6 hours, a manufacturing method including the step of heating and injecting the electrolyte solution can be employed as described later and thus, impregnation property of the electrolyte solution into the electrode can be further improved.

The heat shrinking ratio of the separator is measured by the following method. A separator is cut into strips of 1 cm width and 10 cm length, and marked at points (2 total points) 1 cm from both ends of the long side, and the distance (A) between the two points before the heat treatment is measured. Next, the separator strips are allowed to stand for 6 hours in a state where substantially no tension is applied in a thermostat oven at 80° C., then cooled to room temperature (eg. 25° C.), and then the distance (B) between the two points is measured. The shrinking ratio of the separator is calculated by, {A distance (A) between two points before heat treatment−a distance (B) between two points after heat treatment}/a distance (A) between two points before heat treatment×100%

Measurement is performed for five samples in each case of the longitudinal direction and the width direction of the separator to obtain the average value. When the shrinking ratio in the longitudinal direction and the shrinking ratio in the width direction are different, the larger one is taken as the shrinking ratio in this specification.

The material constituting the separator is not particularly limited as long as it satisfies the above-mentioned shrinking ratio, but the material that can be used is, for example, a heat-resistant resin component having a heat melting temperature or thermal decomposition temperature of 160° C. or higher, preferably 180° C. or higher.

Examples of such a heat-resistant resin component include polyethylene terephthalate, cellulose, aramid, polyimide, polyamide, polyphenylene sulfide, and the like. Among these, from the viewpoint of heat resistance, cellulose, aramid, polyimide, polyamide and polyphenylene sulfide are preferable. In particular, since heat resistance is 300° C. or higher, heat shrinking is small and shape retention is good, aramid, polyimide, polyamide and polyphenylene sulfide are more preferable, and aramid, polyimide and polyamide are further more preferable, and aramid is particularly preferable.

In the present specification, the "heat melting temperature" refers to the temperature measured by differential scanning calorimetry (DSC) according to JIS K 7121, and the "thermal decomposition temperature" refers to the temperature at which the weight decreases by 10% (10% weight loss temperature) when the temperature is raised from 25° C. by rate of 10° C./min in an air flow, and "heat resistance is 800° C. or higher" means that no deformation such as softening is observed at least at 300° C. In the present specification, the phrase "heat melting or thermal decomposition temperature is 160° C. or higher" means that either a heat melting temperature or a thermal decomposition temperature, which is lower, is 160° C. or higher. For example, in the case of a resin which decomposes without melting by heating, it means that the thermal decomposition temperature is 160° C. or higher.

Aramid is an aromatic polyamide in which one or more kinds of aromatic groups are directly linked by amide bond. The aromatic group is, for example, a phenylene group, and two aromatic rings may be bonded by oxygen, sulfur or an alkylene group (for example, a methylene group, an ethylene group, a propylene group or the like). These aromatic groups may have a substituent, and examples of the substituent include an alkyl group (for example, a methyl group, an ethyl group, a propyl group, etc.), an alkoxy group (for example, a methoxy group, an ethoxy group, propoxy group, etc.), halogen (such as chloro group) and the like. The aramid bonds may be either para type or meta type.

Examples of aramids which can be preferably used in the present embodiment include polymetaphenylene isophthalamide, polyparaphenylene terephthalamide, copolyparaphenylene 3,4'-oxydiphenylene terephthalamlde, and the like, but not limited to these.

Any structure can be employed as a structure of the separator as long as it has good lithium ion permeability and mechanical strength. For example, a fiber aggregate such as a woven fabric or a nonwoven fabric, and a microporous membrane may be used. Further, it may be a combination of two or more different components and/or structures. Among these, a nonwoven fabric separator tends to cause a self-discharge failure due to a microshort circuit when metallic lithium is formed in a dendrite shape, and therefore a microporous membrane separator is preferable.

Further, in one embodiment, it may further have a layer containing an inorganic filler such as oxides or nitrides of aluminum, silicon, zirconium, titanium and the like, for example, alumina, boehmite, fine silica particles and the like.

The average pore diameter of the separator in the present embodiment is preferably 0.01 µm or more, more preferably 0.05 µm or more, and further preferably 0.1 µm or more. By having an average pore diameter of 0.1 µm or more, better lithium ion permeability can be maintained. Further, the average pore diameter is preferably 1.5 µm or less, more preferably 1 µm or less, and still more preferably 0.5 µm or less. When the average pore diameter is 1.5 µm or less, it is possible to suppress a short circuit due to precipitation of lithium. From the same viewpoint, it is preferable that the maximum pore diameter of the nonwoven fabric is 5 µm or less. The pore diameter of the nonwoven fabric can be measured by the bubble point method and the mean flow method described in SIM-F-316. Further, the average pore diameter can be taken as an average value of measured values at arbitrary five places of the separator.

Further, in the separator according to this embodiment, the porosity thereof is preferably 40% or more, more preferably 50% or more, and further preferably 60% or more. In addition, it is preferably 90% or less, and more preferably 80% or less. When the porosity is within the above range, sufficient mechanical strength and good rate property can be obtained. The porosity of the separator may be determined by measuring the bulk density according to JIS P 8118, and calculated according to the equation:

Porosity (%)=[1−(bulk density $\rho$ (g/cm$^3$)/theoretical density of material $\rho_0$ (g/cm$^3$))]×100

As the other measurement methods, a direct observation method using an electron microscope and a mercury penetration method using a mercury porosimeter are exemplified.

Although the thickness of the separator in this embodiment is not particularly limited, it is generally preferably 8 µm or more and 30 µm or less, more preferably 9 µm or more and 27 µm or less, and still more preferably 10 µm or more and 25 µm or less. When the thickness of the separator is 10 µm or more, the safety of the secondary battery can be further enhanced. When the thickness of the separator is 25 μm or less, it is possible to maintain a favorable charge/discharge rate.

<Electrolyte Solution>

As the electrolyte solution of the secondary battery according to the present embodiment, a nonaqueous electrolyte solution containing a nonaqueous solvent and a supporting salt that is stable at the operating potential of the battery is preferable.

Examples of nonaqueous solvents include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); aliphatic carboxylic acid esters such as propylene carbonate derivatives, methyl formate, methyl acetate and ethyl propionate; ethers such as diethyl ether and ethyl propyl ether; and fluorinated aprotic organic solvents obtainable by substituting at least a part of the hydrogen atoms of these compounds with fluorine atom(s), and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) and the like, and fluorinated compound(s) thereof is preferably contained.

Also, in one embodiment, a flame retardant solvent such as a phosphoric acid ester represented by the following formula:

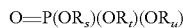

is preferably contained. In the formula, $R_s$, $R_t$ and $R_u$ each independently represent an alkyl group, an alkenyl group, an aryl group, or a cycloalkyl group, and at least two of $R_s$, $R_t$ and $R_u$ may be bonded to form a cyclic structure. It is preferred that the number of carbon atoms of $R_s$, $R_t$ and $R_u$ are each independently 10 or less, and it is more preferred that all of $R_s$, $R_t$ and $R_u$ are an alkyl group or an aryl group.

Examples of the phosphoric acid ester include a phosphoric acid triester such as trimethyl phosphate, triethyl phosphate, tripropyl phosphate, trioctyl phosphate and triphenyl phosphate; among them, triethyl phosphate (TEP) represented by the following formula:

is preferable.

Nonaqueous solvent may be used alone, or in combination of two or more.

As the supporting salt, for example, lithium salts can be used. Examples of lithium salts include $LiPF_6$, lithium imide salts, $LiAsF_6$, $LiAlCl_4$, $LiClO_4$, $LiBF_4$, $LiSbF_6$ and the like. As lithium imide salt, $LiN(C_kF_{2k+1}SO_2)(C_mF_{2m+1}SO_2)$ (wherein k and m are each independently a natural number, preferably 1 or 2) is exemplified. These may be used alone or in combination of two or more of these. From the viewpoint of cost reduction, $LiPF_6$ is preferable.

The concentration of the lithium salt in the electrolyte solution is preferably 0.7 mol/L or more and 2.0 mol/L or less. When the concentration of the lithium salt is 0.7 mol/L or more, sufficient ionic conductivity can be obtained. Also, when the concentration of the lithium salt is 2.0 mol/L or less, the viscosity can be lowered and movement of lithium ions is not disturbed.

The electrolyte solution in the present embodiment preferably contains sulfur-based additives such as a sulfonic acid ester compound.

Examples of the sulfonic acid ester compound may include cyclic monosulfonic acid ester compounds, cyclic disulfonic acid ester compounds, open-chain sulfonic acid ester compounds, and the like.

These additives can form a film on the electrode when initial charge and discharge of the secondary battery is conducted, which can suppress the decomposition of the electrolyte solution and supporting salt. Furthermore, in the lithium ion secondary battery according to the present embodiment having improved impregnation property of the electrolyte solution, the impregnation property of these electrolyte solution additives is also improved along with impregnation of the electrolyte solution. As a result, the difference of the additive concentration depending on the portions, such as the central portion and the edge portion of the electrode, is reduced, and thus an more excellent film can be formed.

Examples of cyclic monosulfonic acid ester compounds include, for example, compounds represented by the following formula (2).

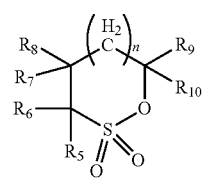

(In the formula (2), n is an integer of 0 or more and 2 or less. $R_5$ to $R_{10}$, independently one another, represent a hydrogen atom, a substituted or unsubstituted alkyl group having 1 to 12 carbon atoms, a substituted or unsubstituted fluoroalkyl group having 1 to 6 carbon atoms, a polyfluoroalkyl group having 1 to 6 carbon atoms.)

In the compound represented by the formula (2), n is preferably 0 or 1, and $R_5$ to $R_{10}$, independently one another, represent a hydrogen atom, a substituted or unsubstituted alkyl group having 1 to 12 carbon atoms, a polyfluoroalkyl group having 1 to 5 carbon atoms, and more preferably, independently one another, represent a hydrogen atom or a polyfluoroalkyl group having 1 to 5 carbon atoms. More preferably, all of $R_5$ to $R_{10}$ are hydrogen atoms, or one or two of $R_5$ to $R_{10}$ is a polyfluoroalkyl group having 1 to 5 carbon atoms and the others are hydrogen atoms. The above-mentioned polyfluoroalkyl group having 1 to 5 carbon atoms is preferably a trifluoromethyl group.

Examples of cyclic monosulfonic acid ester compounds include 1,3-propane sultone, 1,2-propane sultone, 1,4-butane sultone, 1,2-butane sultone, 1,3-butane sultone, 2,4-butane sultone, 1,3-pentane sultone and the like.

Examples of cyclic disulfonic acid ester compounds include compound represented by the following formula (3).

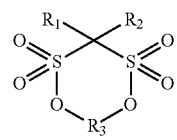

In the formula (3), $R_1$ and $R_2$ are each independently represents a substituent selected from the group consisting of a hydrogen atom, an alkyl group having 1 to 5 carbon atoms, a halogen group, and an amino group. R$_3$ represents an alkylene group having 1 to 5 carbon atoms, a carbonyl group, a sulfonyl group, a fluoroalkylene group having 1 to 6 carbon atoms, or a divalent group having 2 to 6 carbon atoms in which alkylene units or fluoroalkylene units are bonded via an ether group.

In the formula (3), R$_1$ and R$_2$ are each independently preferably a hydrogen atom, an alkyl group having 1 to 3 carbon atoms or a halogen group, and R$_3$ is more preferably an alkylene group or fluoroalkylene group having 1 or 2 carbon atoms.

Preferable examples of the cyclic disulfonic acid ester represented by the formula (3) include, but are not limited to, the following compounds.

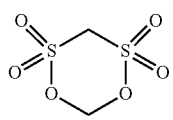

(3-1)

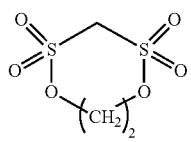

(3-2)

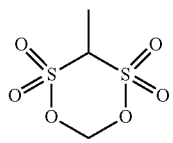

(3-3)

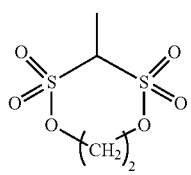

(3-4)

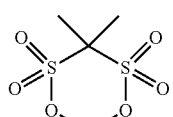

(3-5)

As the open-chain chain disulfonic acid ester, for example, open-chain disulfonic acid esters represented by the following formula (4) can be exemplified.

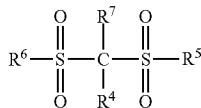

(4)

In the formula (4), R$^4$ and R$^7$, independently each other, represent an atom or a group selected from the group consisting of a hydrogen atom, an alkyl group having 1 to 5 carbon atoms, an alkoxy group having 1 to 5 carbon atoms, an fluoroalkyl group having 1 to 5 carbon atoms, an polyfluoroalkyl group having 1 to 5 carbon atoms, —SO$_2$X$_3$ (X$_3$ is an alkyl group having 1 to 5 carbon atoms), —SY$_1$ (Y$_1$ is an alkyl group having 1 to 5 carbon atoms), —COZ (Z is a hydrogen atom or an alkyl group having 1 to 5 carbon atoms), and a halogen atom. R$^5$ and R$^6$, independently each other, represent an alkyl group having 1 to 5 carbon atoms, an alkoxy group having 1 to 5 carbon atoms, a phenoxy group, a fluoroalkyl group having 1 to 5 carbon atoms, a polyfluoroalkyl group having 1 to 5 carbon atoms, a fluoroalkoxy group having 1 to 5 carbon atoms, a polyfluoroalkoxy group having 1 to 5 carbon atoms, a hydroxyl group, a halogen atom, —NX$_4$X$_5$(X$_4$ and X$_5$ independently each other represent a hydrogen atom or an alkyl group having 1 to 5 carbon atoms) and —NY$_2$CONY$_3$Y$_4$(Y$_2$ to Y$_4$, independently each other, represent a hydrogen atom or an alkyl group having 1 to 5 carbon atoms).

In the formula (4), R$^4$ and R$^7$ are, independently each other, preferably a hydrogen atom, an alkyl group having 1 or 2 carbon atoms, a fluoroalkyl group having 1 or 2 carbon atoms, or a halogen atom, and R$^5$ and R$^6$, independently each other, represent an alkyl group having 1 to 3 carbon atoms, an alkoxy group having 1 to 3 carbon atoms, a fluoroalkyl group having 1 to 3 carbon atoms, a hydroxyl group or a halogen atom.

Examples of the open-chain disulfonic acid ester compound represented by the formula (4) include, but not limited to, the following compounds.

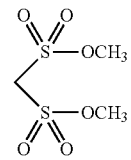

(101)

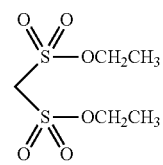

(102)

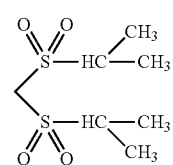

(103)

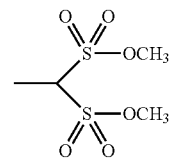

(104)

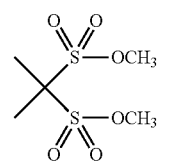

(105)

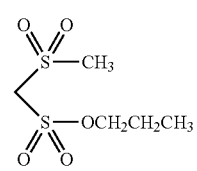

(106)

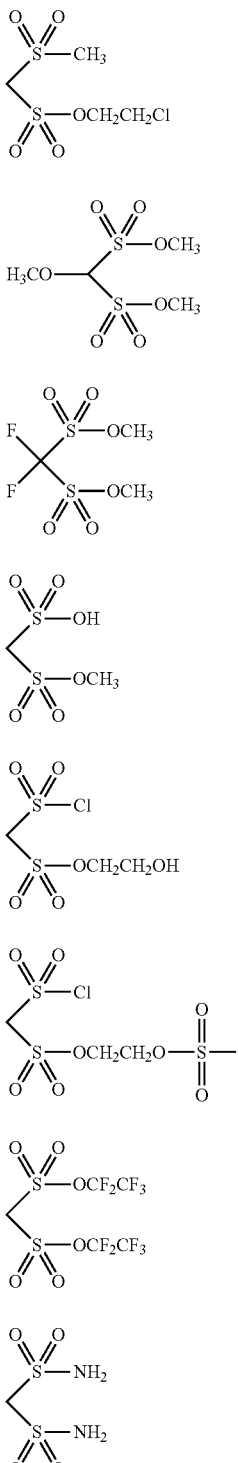
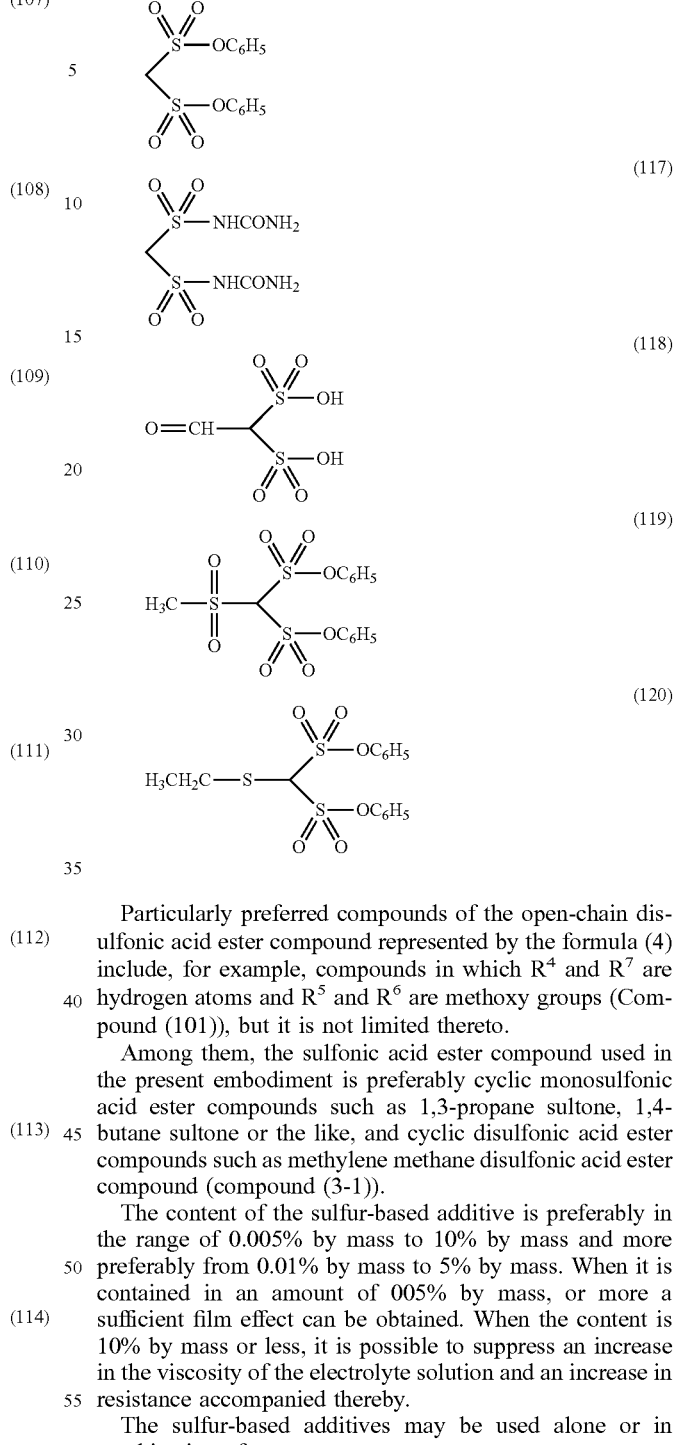

Particularly preferred compounds of the open-chain disulfonic acid ester compound represented by the formula (4) include, for example, compounds in which R[4] and R[7] are hydrogen atoms and R[5] and R[6] are methoxy groups (Compound (101)), but it is not limited thereto.

Among them, the sulfonic acid ester compound used in the present embodiment is preferably cyclic monosulfonic acid ester compounds such as 1,3-propane sultone, 1,4-butane sultone or the like, and cyclic disulfonic acid ester compounds such as methylene methane disulfonic acid ester compound (compound (3-1)).

The content of the sulfur-based additive is preferably in the range of 0.005% by mass to 10% by mass and more preferably from 0.01% by mass to 5% by mass. When it is contained in an amount of 005% by mass, or more a sufficient film effect can be obtained. When the content is 10% by mass or less, it is possible to suppress an increase in the viscosity of the electrolyte solution and an increase in resistance accompanied thereby.

The sulfur-based additives may be used alone or in combination of two or more.

In one embodiment, the electrolyte solution may further contain additives other than the above sulfur-based additive.

<Outer Package>

An outer package can be appropriately selected as long as it has stability in an electrolyte solution and sufficient steam barrier properties. For example, in the case of a stacked laminate type secondary battery, laminate films, such as polypropylene, polyethylene or the like coated with aluminium, silica or alumina can be used as the outer package. Examples of the outer package other than the film include a metal case and a resin case. The outer package may be constituted by a single member or may be constituted by combining a plurality of members. In one embodiment, it is preferable to use an aluminum laminate film from the viewpoints of weight reduction, heat dissipation and easiness of proccessability.

<Structure of Secondary Battery>

A secondary battery according to the present embodiment may have a structure in which an electrode element having a positive electrode and a negative electrode disposed so as to face each other and an electrolyte solution are enclosed in the outer package. Secondary batteries may be selected from, depending on a structure of electrode or a shape, various types such as cylindrical type, flat spirally wound prismatic type, stacked square shape type, coin type, flat wound laminated type and stacked laminate type and the like. Although the present invention can be applied to any type of secondary battery, the stacked laminate type is preferable in that it is inexpensive and has excellent flexibility in designing the cell capacity by changing the number of stacked electrodes.

Figure 2:
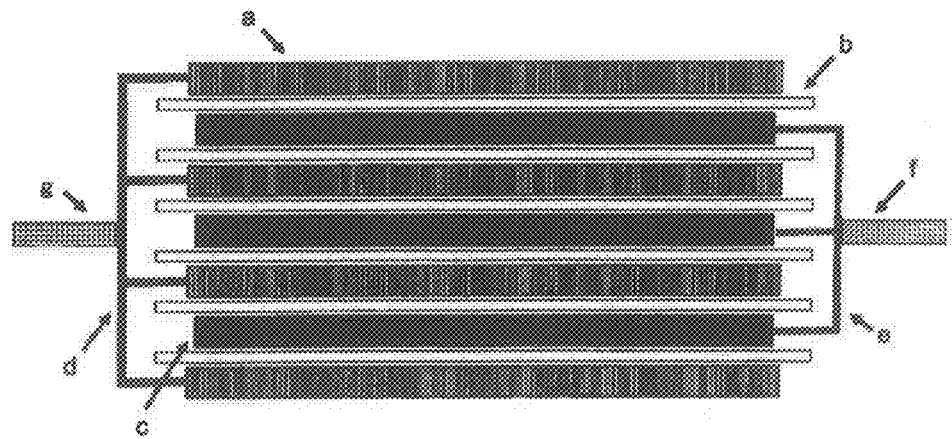
FIG. 2 is a schematic sectional view of an electrode element included in a lithium ion secondary battery according to one embodiment of the present invention.

FIG. 2 is a schematic cross-sectional view showing a structure of an electrode element included in a stacked laminate type secondary battery according to one embodiment of the present invention. In this electrode element, one or more positive electrodes c and one or more negative electrodes a are alternately stacked with the separator b sandwiched therebetween. The positive electrode current collector e of each positive electrode c is welded to each other at its end part which is not covered with the positive electrode active material layer to form an electrical connection, and the positive electrode terminal f is further welded to the welded portion. The negative electrode current collector d of each negative electrode a is welded to each other at its end part which is not covered with the negative electrode active material layer to form an electrical connection, and the negative electrode terminal g is further welded to the welded portion. Although the shape and size of the active material layer are not particularly limited, for example, as a stacked laminate type battery, it is possible to have a substantially rectangular shape with a long side of 3 to 70 cm and a short side of 2 to 60 cm.

Figure 3:
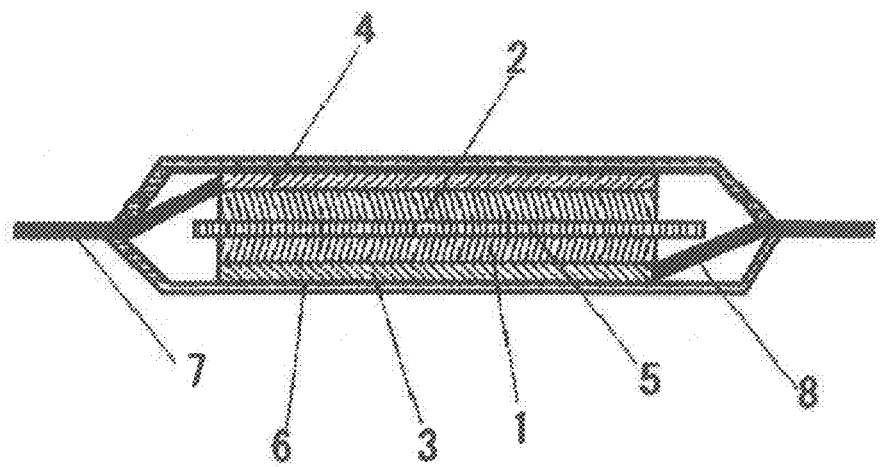
FIG. 3 is a sectional view of a lithium ion secondary battery according to one embodiment of the present invention.
Figure 4:
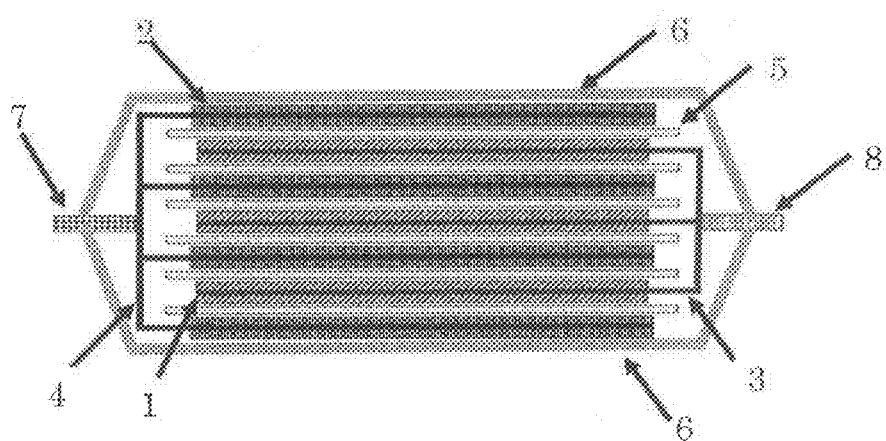
FIG. 4 is a schematic sectional view showing a structure of a stacked laminate type of a secondary battery according to one embodiment of the present invention.

FIG. 3 shows a laminate-type secondary battery as an example of a secondary battery according to this embodiment. The separator 5 is sandwiched between a positive electrode comprising a positive electrode active material layer 1 containing a positive electrode active material and a positive electrode current collector 3 and a negative electrode comprising a negative electrode active material layer 2 and a negative electrode current collector 4. The positive electrode current collector 3 is connected to a positive electrode lead terminal 8, and the negative electrode current collector 4 is connected to a negative electrode lead terminal 7. A packaging laminate 6 is used for the outer package, and the inside of the secondary battery is filled with an electrolyte solution. It is also preferred that an electrode element (also referred to as "battery element" or "electrode stack") may have, as shown in FIG. 4, an arrangement in which a plurality of positive electrodes and a plurality of negative electrodes are stacked via separators.

Examples of the laminate resin film used for the laminate type include aluminum, aluminum alloy and titanium foil, and the like. Examples of the material of the heat bonding portion of the metal laminate resin film include thermoplastic polymer materials such as polyethylene, polypropylene, polyethylene terephthalate and the like. In addition, each of the metal laminate resin layer and the metal foil layer is not limited to one layer, and may be two or more layers.

Figure 5:
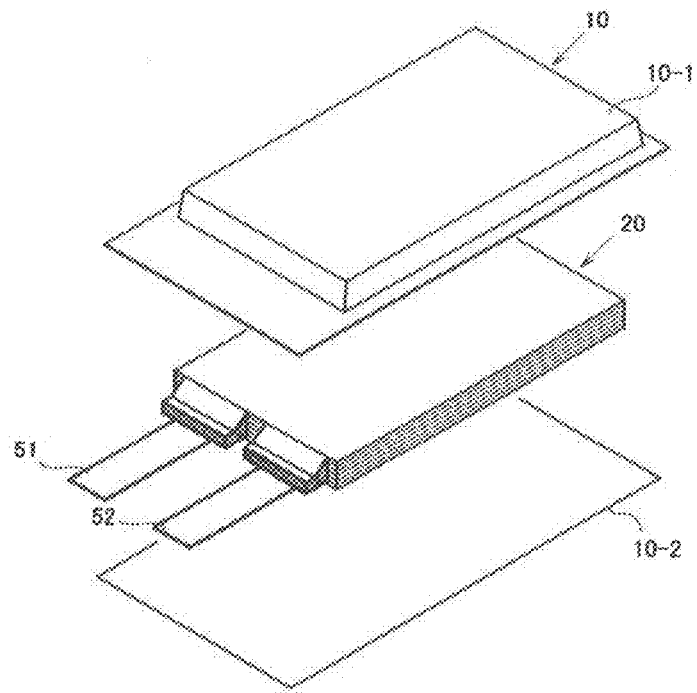
FIG. 5 is an exploded perspective view showing the basic structure of a film-packaged battery.
Figure 6:
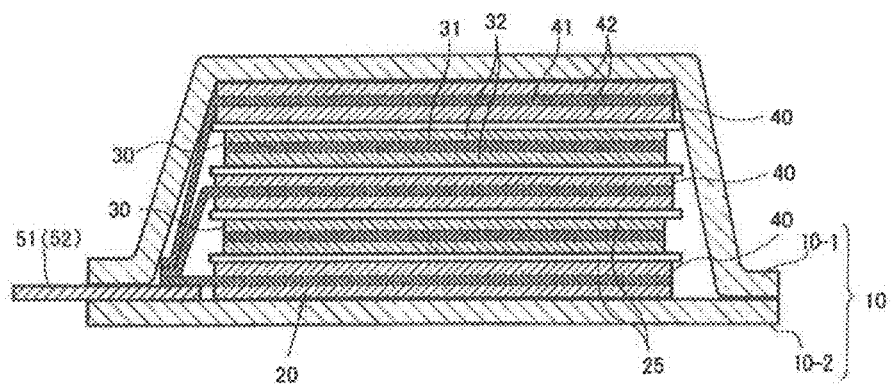
FIG. 6 is a cross-sectional view schematically showing a cross section of the battery in FIG. 5.

As another embodiment, a secondary battery having a structure as shown in FIG. 5 and FIG. 6 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 6. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

In the secondary battery in FIG. 3, the electrode tabs are drawn out on both sides of the package, but a secondary battery to which the present invention may be applied may have an arrangement in which the electrode tabs are drawn out on one side of the package as shown in FIG. 5. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 6). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 5, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 5 and FIG. 6, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

The lithium ion secondary battery according to the present embodiment can be produced, for example, by the following manufacturing method.

<Method of Manufacturing Secondary Battery>

A further embodiment of the present invention relates to a method for producing a lithium ion secondary battery.

The method of manufacturing a lithium ion secondary battery according to the present embodiment is a method of manufacturing a lithium ion secondary battery comprising an electrode element comprising a positive electrode, a negative electrode and a separator, and an electrolyte solution, wherein a shrinking ratio of the separator by heat treatment at 80° C. for 6 hours is 2% or less, and the method comprising steps of:

preparing an electrode element comprising a positive electrode, a negative electrode and a separator;

enclosing the prepared electrode element in an outer package;

injecting an electrolyte solution into the outer package;

sealing the outer package comprising the electrode element and the electrolyte solution;

wherein, in the step of injecting the electrolyte solution, the electrolyte solution is heated to 80° C. or higher to perform the injection.

According to the present embodiment, by using a high heat resistant separator having a shrinking ratio of 2% or less by heat treatment at 80° C. for 6 hours, it is possible to perform heating the electrolytic solution to 80° C. or higher during the manufacturing process. This makes it possible to lower the viscosity of the electrolyte solution and to improve the impregnation property of the electrolyte solution to the electrode.

In the present embodiment, the temperature for heating the electrolyte solution can be appropriately set within the range of 80° C. or higher in consideration of the combination with the type and concentration of the nonaqueous solvent and supporting salt used for the electrolytic solution. From the viewpoint of lowering the viscosity of the electrolyte solution, the temperature is more preferably 85° C. or higher, and in some cases, the heating temperature higher than 90° C. is more preferable. The upper limit of the heating temperature is preferably 105° C. or less in consideration of the boiling point of the nonaqueous solvent of the electrolyte solution and the heat resistance of the outer package and the like.

Injection of the electrolyte solution may be followed by quick cooling to the ambient temperature, or the high temperature state of 80° C. or higher may be maintained in a state where the electrolytic solution and the electrode element are in contact. The time to maintain the high temperature state is preferably in the range of 1 minute to 24 hours in consideration of production efficiency.

In the method of manufacturing the lithium ion secondary battery according to the present embodiment, any configuration may be employed as long as it is a secondary battery using a separator having a shrinking ratio of 2% or less by heat treatment at 80° C. for 6 hours. The constituent components can be appropriately selected from those detailed in the present specification as described above.

In particular, the method of manufacturing a lithium ion secondary battery according to the present embodiment is suitable for manufacturing a lithium ion secondary battery which comprises a positive electrode having a coating amount per unit area of 50 mg/cm$^2$ or more and an electrode density of 3.3 g/cc or more and a negative electrode having a coating amount of 24 mg/cm$^2$ or more and an electrode density of 1.5 g/cc or more. Such electrodes have small porosity and contain pores with small pore diameters, and therefore it is difficult to sufficiently impregnate the electrodes with an electrolyte solution in a short time by the conventional method of manufacturing a secondary battery. However, according to the manufacturing method of the present embodiment, it is possible to impregnate with the electrolyte solution sufficiently into the interior of the electrode or the spaces between the particles of the electrode active material layer in a shorter time.

In addition, the method of manufacturing a lithium ion secondary battery according to the present embodiment is suitable for manufacturing a lithium ion secondary battery using a single layer microporous film composed of an aramid resin as a separator having a small thermal shrinking ratio. Since the microporous film comprising an aramid resin has a small shrinking ratio at high temperature, the effect of improving the impregnation by the manufacturing method according to this embodiment can be highly achieved.

Furthermore, the lithium ion secondary battery according to the present embodiment is suitable for manufacturing a lithium ion secondary battery using an electrolyte solution containing a sulfur-based additive such as a sulfonic acid ester compound, a lithium ion secondary battery using a flame retardant solvent such as phosphoric acid ester or the like, and a lithium ion secondary battery containing a lithium nickel composite oxide represented by the above formula (1) as a positive electrode active material.

Hereinafter, examples of preferred embodiments of the present invention will be described.

<Assembled Battery>

A plurality of secondary batteries according to the present embodiment may be combined to form an assembled battery. The assembled battery may be configured by connecting two or more secondary batteries according to the present embodiment in series or in parallel or in combination of both. The connection in series and/or parallel makes it possible to adjust the capacitance and voltage freely. The number of secondary batteries included in the assembled battery can be set appropriately according to the battery capacity and output.

<Vehicle>

The secondary battery or the assembled battery according to the present embodiment can be used in vehicles. Vehicles according to an embodiment of the present invention include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. The vehicles according to the present embodiment is not limited to automobiles, it may be a variety of power source of other vehicles, such as a moving body like a train.

<Power Storage Equipment>

The secondary battery or the assembled battery according to the present embodiment can be used in power storage system. The power storage systems according to the present embodiment include, for example, those which is connected between the commercial power supply and loads of household appliances and used as a backup power source or an auxiliary power in the event of power outage or the like, or those used as a large scale power storage that stabilize power output with large time variation supplied by renewable energy, for example, solar power generation.

EXAMPLES

Hereinafter, the present invention will be described in detail with reference to examples, but the present invention is not limited to these examples.

Example 1

(Positive Electrode)

$LiNi_{0.8}Mn_{0.15}Co_{0.05}O_2$ as a positive electrode active material, PVdF as a binder and acetylene black as a conductive assisting agent were mixed at a weight ratio of 92/4/4 and kneaded using N-methylpyrrolidone as a solvent to prepare a positive electrode slurry. The prepared slurry was applied to both sides of an aluminum foil current collector having a thickness of 20 μm so that the coating amount per unit area after drying was 50 mg/cm$^2$, then dried, and further pressed to adjust the electrode density to 3.3 g/cc to obtain a positive electrode.

(Negative Electrode)

Artificial graphite as a negative electrode active material, PVdF as a binder and acetylene black as a conductive assisting agent were mixed at a weight ratio of 98/5/2 and kneaded using N-methylpyrrolidone as a solvent to prepare a negative electrode slurry. The prepared slurry was applied on both sides of a copper foil current collector having a thickness of 20 μm so that the coating amount per unit area after drying was 24 mg/cm$^2$, then heat treated at 80° C. under a nitrogen atmosphere to dry, and further pressed to adjust the electrode density to 1.5 g/cc to obtain a negative electrode.

(Electrode Element)

Three prepared positive electrodes and four negative electrodes were stacked via aramid microporous membranes (shrinking ratio of less than 0.5% at 80° C. for 6 hours). End portions of the positive electrode current collectors on which the positive electrode active material was not formed and end portions of the negative electrode current collectors on which the negative electrode active material was not formed were respectively welded. To the respective welded portions, a positive electrode terminal formed of aluminum and a negative electrode terminal formed of nickel were further welded respectively to obtain an electrode element having a planar stacked structure.

(Electrolyte Solution)

LiPF$_6$ as a supporting electrolyte was dissolved in a mixed solvent of EC/DEC (volume ratio: EC/DEC=30/70) as non-aqueous solvent so as to have a concentration of 1 M in an electrolyte solution. Further, methylene methane disulfonic acid ester (MMDS (compound (3-1)) as an additive was dissolved in the electrolyte solution so as to have a concentration of 1% by mass, to obtain an electrolyte solution.

(Manufacturing of Secondary Battery)

The prepared electrode element was enclosed in an aluminum laminate outer package and sandwiched between two hot plates. Keeping this configuration, the liquid inlet port was directed upward and heated to 80° C. Thereafter, the electrolyte solution heated to 80° C. in a separate thermostatic oven was injected. It was moved to a vacuum chamber and the pressure was reduced to 0.1 atm. The step of the injection and the pressure reduction was repeated three times. Thereafter, the outer package was sealed while reducing the pressure to 0.1 atm, to obtain a lithium ion secondary battery.

(Evaluation)

1. Evaluation of Initial Discharge Capacity

The prepared secondary battery was charged and discharged once in a thermostatic oven kept at 25° C., and the initial discharge capacity was measured. Charging was performed at 1 C up to 4.2 V and then at constant voltage for 2.5 hours in total, and discharge was performed at 1 C to 2.5 V as constant current discharge.

2. Evaluation of Capacity Retention Ratio

Charging was performed at 1 C up to 4.2 V and then at constant voltage for 2.5 hours in total, and discharge was performed at 1 C to 2.5 V as constant current discharge. This cycle was repeated 300 times at 45° C. The ratio of the discharge capacity after 300 cycles to the initial discharge capacity was determined as the capacity retention ratio.

3. Evaluation of Sulfur Content Ratio

For the secondary battery prepared in the same manner, the positive electrode and the negative electrode were taken out from the secondary battery after 1 cycle was performed. The sulfur content (A) in the central portion and the sulfur content (B) in the edge portion were measured. Specifically, the electrode recovered by disassembling the cell was cut, and washed with diethyl carbonate. The amount of SOx generated when heated to 1000° C. by oxygen combustion ion chromatography was measured, and the sulfur concentration (wt %) per weight of the active material layer was calculated. The measured value is an average value of the positive electrodes (3 pieces) and the negative electrodes (4 pieces) in each case.

The results are shown in Table 1.

Example 2

A secondary battery was prepared and evaluated in the same manner as in Example 1 except that an aramid non-woven fabric (shrinking ratio of less than 0.5% by heat treatment at 80° C. for 6 hours) was used as a separator. The results are shown in Table 1.

Example 3

A secondary battery was prepared and evaluated in the same manner as in Example 1 except that the injection of electrolyte solution was performed using an electrolyte solution heated to 95° C. in a thermostatic oven at 95° C. The results are shown in Table 1.

Example 4

A secondary battery was prepared and evaluated in the same manner as in Example 1 except that LiPF$_6$ as a supporting electrolyte was dissolved in a mixed solvent of TEP (triethyl phosphate)/FEC (fluoroethylene carbonate) (volume ratio: TEP/FEC=97.5/2) so as to have a concentration of 1 M in the electrolyte solution, and MMDS (compound (3-1)) as an additive was dissolved in the electrolyte solution so as to have a concentration of 0.5% by mass, and thus obtained solution was used as a electrolyte solution. The results are shown in Table 1.

Comparative Example 1

A secondary battery was prepared and evaluated in the same manner as in Example 1 except that the injection of electrolyte solution was performed using an electrolyte solution at room temperature (25° C.). The results are shown in Table 1.

Comparative Example 2

A secondary battery was prepared and evaluated in the same manner as in Example 1 except that a polypropylene microporous membrane (shrinking ratio of 2% or more by heat treatment at 80° C. for 6 hours) was used as the separator. The results are shown in Table 1.

TABLE 1

| | separator (heat shrinking ratio (%)) | temperature at injection of electrolyte solution | electrolyte solution | sulfur content ratio (As/Bs) | initial discharge capacity (mAh) | capacity retention (%) |
|---|---|---|---|---|---|---|
| Example 1 | aramid microporous membrane | 80° C. | EC/DEC (30/70) + MMDS | Posi:1.0 Nega:1.0 | 1850 | 82 |
| Example 2 | aramid nonwoven fabric (0.5%) | 80° C. | EC/DEC (30/70) + MMDS | Posi:0.9 Nega:1.0 | 1820 | 78 |
| Example 3 | aramid microporous membrane (0.5%) | 95° C. | EC/DEC (30/70) + MMDS | Posi:1.0 Nega:1.0 | 1860 | 81 |
| Example 4 | aramid microporous membrane (0.5%) | 95° C. | TEP/FEC (97.5/2) + MMDS | Posi:0.8 Nega0.9 | 1800 | 72 |
| Comparative Example 1 | aramid microporous membrane (0.5%) | 25° C. | EC/DEC (30/70) + MMDS | Posi:0.69 Nega:0.69 | 1780 | 65 |
| Comparative Example 2 | polypropylene microporous membrane (2%) | 80° C. | EC/DEC (30/70) + MMDS | n.d. | 100 or less (short circuit failure) | n.d. |

Posi = positive electrode;
Nega = negative electrode;
n.d. = not determined

As shown in Examples 1 and 2, it was possible to obtain a lithium ion secondary battery with a small difference in sulfur concentration between the central portion and the edge portion of the electrode by heating the electrolyte solution to 80° C. or higher and performing the injection using it. It is suggested that in a lithium ion secondary battery having a small difference in sulfur concentration between the central portion and the edge portion of the electrode, a larger cell capacity can be taken out as a result of sufficiently impregnating the inside of the electrode with the electrolyte solution, and furthermore, a film can be formed effectively and the capacity retention ratio is improved as a result of more uniform impregnation of the additive. Since the initial discharge capacity of the secondary battery of Comparative Example 2 using a separator having a large heat shrinking ratio was 100 mAh or less, the subsequent evaluation was not conducted.

INDUSTRIAL APPLICABILITY

The battery according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for moving/transporting media such as trains, satellites and submarines including electrically driven vehicles such as an electric vehicle, a hybrid vehicle, an electric motorbike, and an electric-assisted bike; backup power supplies for UPSs; and electricity storage facilities for storing electric power generated by photovoltaic power generation, wind power generation and the like.

EXPLANATION OF REFERENCE a negative electrode
b separator
c positive electrode
d negative electrode current collector
e positive electrode current collector
f positive electrode terminal
g negative electrode terminal
1 positive electrode active material layer
2 negative electrode active material layer
3 positive electrode current collector
4 negative electrode current collector
5 separator
6 laminate package
7 negative electrode lead terminal
8 positive electrode lead terminal
10 film package
20 battery element
25 separator
30 positive electrode
40 negative electrode

The invention claimed is:
1. A lithium ion secondary battery comprising an electrode element comprising a positive electrode, a negative electrode and a separator, and an electrolyte solution,
wherein a coating amount per unit area of the positive electrode is 50 mg/cm2 or more and an electrode density of the positive electrode is 3.3 g/cc or more,
a coating amount per unit area of the negative electrode is 24 mg/cm2 or more and an electrode density of the negative electrode is 1.5 g/cc or more,
the separator has a shrinking ratio of 2% or less by heat treatment at 80° C. for 6 hours,
the electrolyte solution comprises at least one sulfonic acid ester compound, and
a ratio of a sulfur content in the central portion (As) and a sulfur content in the edge portion (Bs) of the positive electrode and the negative electrode, in each, is 0.7≤As/Bs≤1.1.

2. The lithium ion secondary battery according to claim 1, wherein the separator comprises a heat-resistant resin having a thermal melting temperature or a thermal decomposition temperature of 160° C. or higher.

3. The lithium ion secondary battery according to claim 2, wherein the separator comprises an aramid resin.

4. The lithium ion secondary battery according to claim 1, wherein the positive electrode comprises a lithium nickel composite oxide represented by the following formula:

$$Li_\alpha Ni_\beta Me_\gamma O_2 \quad (1)$$

(In formula (1), $0.9 \leq \alpha \leq 1.5$, $\beta+\gamma=1$, $0.6 \leq \beta < 1$, Me is at least one selected from the group consisting of Co, Mn, Al, Fe, Mg, Ti, Ba and B).

5. The lithium ion secondary battery according to claim 1, wherein the electrolyte solution comprises a phosphoric acid ester.

6. The lithium ion secondary battery according to claim 1, which is a stacked laminate type.

7. A method of manufacturing a lithium ion secondary battery comprising an electrode element comprising a positive electrode, a negative electrode and a separator, and an electrolyte solution,
wherein a shrinking ratio of the separator by heat treatment at 80° C. for 6 hours is 2% or less,
the method comprising the steps of:
preparing an electrode element comprising a positive electrode, a negative electrode and a separator,
enclosing the prepared electrode element in an outer package,
injecting the electrolyte solution into an outer package,
sealing the outer package comprising the electrode element and the electrolyte solution,
wherein, in the step of injecting the electrolyte solution, the electrolyte solution is heated to 80° C. or higher to perform injection.

8. The method of manufacturing a lithium ion secondary batter according to claim 7,
wherein a coating amount per unit area of the positive electrode is 50 mg/cm² or more and an electrode density of the positive electrode is 3.3 g/cc or more, and
a coating amount per unit area of the negative electrode is 24 mg/cm² or more and an electrode density of the negative electrode is 1.5 g/cc or more.

9. The method of manufacturing a lithium ion secondary battery according to claim 7, wherein the electrolyte solution comprises at least one sulfonic acid ester compound.

10. A lithium ion secondary battery produced by the method of manufacturing a lithium ion secondary battery according to claim 7.

* * * * *